UNITED STATES PATENT OFFICE.

JOHN MEYENBERG, OF KENT, WASHINGTON.

PROCESS OF MAKING SUBSTITUTES FOR MOTHERS' MILK.

SPECIFICATION forming part of Letters Patent No. 682,103, dated September 3, 1901.

Application filed July 20, 1900. Renewed February 14, 1901. Serial No. 47,352. (No specimens.)

*To all whom it may concern:*

Be it known that I, JOHN MEYENBERG, a citizen of the United States, residing in Kent, in the county of King and State of Washington, have invented certain new and useful Improvements in Processes of Making a Substitute for Mothers' Milk, of which the following is a specification.

This invention relates to an improved process of making from cow's milk a substitute for mother's milk, the new product being of such a nature that it can be shipped to any climate and preserved for any length of time in good condition; and the invention consists of the process, hereinafter described, of producing a substitute for mother's milk which consists of the following steps: first, aerating fresh cow's milk; second, filtering the same; third, removing the cream from a portion of the milk; fourth, decaseinizing the so-obtained skimmed milk; fifth, filtering the whey thus obtained; sixth, mixing with the whey the separated cream, remaining portion of the milk, and a small quantity of sugar; seventh, filtering and simultaneously heating the milk under exclusion of air, and, lastly, concentrating the milk *in vacuo*.

In preparing my improved substitute for mother's milk fresh milk from healthy cows is immediately after receipt from the farmer thoroughly purified by subjecting it primarily to the influence of air in a suitable aerator by which the adhering disagreeable flavor is removed. The milk is then transferred into a filter containing carefully-cleaned gravel of uniform size, through which the milk is drawn by means of a vacuum and by which any mechanical impurities contained in the milk are retained. From a portion of this aerated and filtered milk the cream is then removed, and from the skimmed milk thus obtained the casein is removed. The whey remaining is then purified by permitting it to pass through a suitable cloth filter. The remaining portion of the aerated and filtered milk is then mixed with the cream separated from the decaseinized milk, and to the mixture is added the clear filtered whey. The required quantity of sugar is then added to this mixture and the same slowly raised to the boiling-point and held for a short time at the boiling-point, so as to evaporate in the open air. It is then transferred into a closed apparatus, in which it is again filtered and at the same time subjected to heat, so that the milk is raised above the boiling-point, while all air is excluded, whereby the casein still contained in the milk assumes the condition of the casein in mother's milk—*i, e.*, it is converted into a loose pasty mass. By this conversion of the casein and the heating of the milk the same is rendered easily digestible, while the bacilli are killed before the milk is transferred to the vacuum-pan. From the filtering and heating apparatus the milk is now transferred, still under exclusion of air, into the vacuum-pan and in the same concentrated to the required consistency. It is then canned, and finally in the cans subjected to the usual sterilizing, so as to preserve the same for any length of time.

In my improved process no foreign substance except sugar is added to milk, and the latter only so as to supply the same percentage of sugar as that contained in mother's milk.

The advantages of my improved process are, first, that by the aeration and filtration of the cow's milk employed the foreign flavors and impurities are removed before the same is subjected to further treatment; second, that by the filtering of the whey the same is rendered perfectly clear and free from casein before being mixed with the remaining portions of the milk; third, by reducing the quantity of casein in the milk and adding a small percentage of sugar a product is obtained which approaches mother's milk closely in quality and which is very advantageous for feeding infants and invalids; fourth, by the second filtration and superheating under exclusion of air after the whey, cream, milk, and sugar are mixed all bacteria which may be contained in the milk are destroyed, so that the milk is conducted free of bacteria into the vacuum-pan.

Having thus described my invention, I claim as new and desire to secure by Letters Patent—

The process herein described of producing a substitute for mother's milk, which consists, first, in aerating fresh cow's milk, second, filtering the same, third, removing the cream from a portion of the milk, fourth, decaseinizing the so-obtained skimmed milk, fifth, filtering the whey thus obtained, sixth, mixing with the whey the separated cream, remaining portion of the milk and a small quantity of sugar, seventh, filtering and simultaneously heating the milk under exclusion of air, and lastly, concentrating the milk *in vacuo*, substantially as set forth.

In testimony that I claim the foregoing as my invention I have signed my name in presence of two subscribing witnesses.

JOHN MEYENBERG.

Witnesses:
R. E. SAILOR,
H. B. MADISON.